United States Patent
Park et al.

(10) Patent No.: US 12,492,369 B2
(45) Date of Patent: Dec. 9, 2025

(54) HYBRID SYSTEM OF CULTURE AND PURIFICATION PROCESS FOR MANUFACTURING ANTIBODY PHARMACEUTICALS

(71) Applicant: PRESTIGE BIOLOGICS CO., LTD., Chungcheongbuk-do (KR)

(72) Inventors: Joo Yang Park, Seoul (KR); Ja Won Shin, Sejong (KR); Dae Yang Oh, Seoul (KR)

(73) Assignee: PRESTIGE BIOLOGICS CO., LTD., Cheongju-si (KR)

( * ) Notice: Subject to any disclaimer, the term of this patent is extended or adjusted under 35 U.S.C. 154(b) by 626 days.

(21) Appl. No.: 17/910,542

(22) PCT Filed: Mar. 8, 2021

(86) PCT No.: PCT/KR2021/002828
§ 371 (c)(1),
(2) Date: Sep. 9, 2022

(87) PCT Pub. No.: WO2021/194124
PCT Pub. Date: Sep. 30, 2021

(65) Prior Publication Data
US 2023/0128089 A1   Apr. 27, 2023

(30) Foreign Application Priority Data

Mar. 23, 2020  (KR) .................. 10-2020-0035260

(51) Int. Cl.
*C12M 1/00*  (2006.01)
(52) U.S. Cl.
CPC ............ *C12M 47/12* (2013.01); *C12M 23/14* (2013.01); *C12M 23/28* (2013.01); *C12M 29/04* (2013.01)

(58) Field of Classification Search
None
See application file for complete search history.

(56) References Cited

U.S. PATENT DOCUMENTS

2013/0260419 A1   10/2013   Ransohoff
2014/0255994 A1   9/2014   Konstantinov
(Continued)

FOREIGN PATENT DOCUMENTS

JP          3547715 B2      7/2004
KR     10-2014-0059753 A    5/2014
(Continued)

OTHER PUBLICATIONS

Gronemeyer P., et al.; Trends in upstream and downstream process development for antibody manufacturing, Bioengineering, 2014, vol. 1, No. 4, pp. 188-212 (Year: 2014).*

(Continued)

*Primary Examiner* — Jyoti Nagpaul
(74) *Attorney, Agent, or Firm* — Dinsmore & Shohl LLP; Yongsok Choi, Esq.

(57) ABSTRACT

The present invention relates to a hybrid system of a culture and purification process for manufacturing antibody pharmaceuticals, in which one or more devices selected from bioreactor, chromatography, and filtration equipment are provided with one or more materials selected from among SU disposable bags and stainless steel (SS), and one or more devices selected from preparation and storage tanks of a medium and a buffer are provided with SS material, thereby simultaneously obtaining the advantages of a SS process system and a SU process system, and preventing cross-contamination through independent operation of a culture unit and a purification unit, and a process system is designed and positioned such that an effluent stream exiting individual culture units is introduced into one or more purification units (Continued)

using a control unit, thereby avoiding a bottleneck phenomenon from occurring in the purification process.

6 Claims, 3 Drawing Sheets

(56) References Cited

U.S. PATENT DOCUMENTS

2019/0093142 A1　3/2019　Reichelt
2020/0131251 A1　4/2020　Mhalasakant

FOREIGN PATENT DOCUMENTS

KR　10-2017-0007457 A　1/2017
WO　　2019231652 A2　12/2019

OTHER PUBLICATIONS

Gronemeyer et al (Year: 2014).*
Extended European search report for EP21774031.5 dated Mar. 28, 2024.
International Search Report from corresponding PCT Application No. PCT/KR2021/002828, dated Aug. 13, 2021.
Gronemeyer, P., et al.; "Trends in upstream and downstream process development for antibody manufacturing", Bioengineering, 2014, vol. 1, No. 4, pp. 188-212.
Jacquemart, R., et al.; "A single-use strategy to enable manufacturing of affordable biologics", Computational and Structural Biotechnology Journal, 2016, vol. 14, pp. 309-318.
Office Action from corresponding Korean Patent Application No. 10-2020-0035260, dated Aug. 10, 2021.

* cited by examiner

HYBRID SYSTEM OF CULTURE AND PURIFICATION PROCESS FOR MANUFACTURING ANTIBODY PHARMACEUTICALS

CROSS-REFERENCE TO RELATED APPLICATIONS

This application is a National Phase application of PCT Application No. PCT/KR2021/002828, filed on 8 Mar. 2021, which claims priority to Korean Patent Application No. 10-2020-0035260, filed on 23 Mar. 2020. The entire disclosures of the applications identified in this paragraph are incorporated herein by reference.

TECHNICAL FIELD

The present invention relates to a hybrid system of culture and purification processes for manufacturing antibody pharmaceuticals.

BACKGROUND ART

Biopharmaceuticals can be broadly classified into new biologics, improved biopharmaceuticals (biobetters) and biosimilars, and compared with chemically synthesized pharmaceuticals, have fewer side effects and less preclinical data required in research and development, and are easier to predict product efficacy and safety and due to the relatively high probability of clinical success, active development of technology is progressing worldwide.

The process of manufacturing biopharmaceuticals consists of initial candidate material and cell line development, a culture process (upstream processing (USP)), a purification process (downstream processing (DSP)), and a fill and finish process, and particularly, in the case of biosimilar product production, processing optimization in the culture process (USP) and purification process (DSP) is directly related to cost competitiveness, so interest in optimizing the process of manufacturing biosimilars with low cost, high purity and high yield is growing.

In this process, the culture process (USP) corresponds to the process of continuously increasing the number of cells through cell division for approximately 6 weeks from the initial flask stage of less than 1 liter to the final production bioreactor stage of 15,000 L or more, after thawing the cell line, and culture methods that can be used herein include batch culture, fed-batch culture, continuous culture, and perfusion culture and the like.

In addition, the purification process (DSP) is the process of extracting a protein to be used as a pharmaceutical with high purity and high efficiency from the culture in which cells and cell debris are mixed through the manipulation and use of various types of chromatographs and filters, and during the purification process (DSP), column purification, virus removal and ultra/diafiltration are performed through the use of a chromatograph and filters.

Meanwhile, components and systems used in the USP and DSP are divided into stainless steel (SS) and single-use (SU) using disposable bags or tubes in terms of material, and among these, although the SS process system including device components made of SS has advantages of easy implementation on a relatively large scale, low operation cost and easy automation, the initial installation cost is high, it is vulnerable to contamination and prone to the downstream bottleneck phenomenon occurring in the DSP, caused by the implementation of a large-sized bioreactor.

The SU process system, which has recently been introduced, uses disposable bags or tubes with a volume of 0.1 to 2,000 L as device components, and compared to the SS process system, has advantages of relatively low cost for initial installation and being relatively resistant to contamination because a corresponding part can be replaced upon contamination. However, scale-up limitations, continuous operation costs caused by frequent bag replacement and the input of a lot of labor during equipment replacement are pointed out as disadvantages.

In the field of biopharma today, there are more and more companies serving as contract manufacturing organizations (CMOs) for drugs for clinical trials and commercial use, and furthermore, improvement in one-stop service from cell line development and related process development, scale-up to commercial production is also made.

In order to meet the needs of various customers in the biopharma CMO business, much flexibility is required due to multi-product production and frequent changeover. In the case of the SS process system that has been widely used conventionally, it is impossible to replace a bioreactor at any time, so there is a problem that production capacity must be adjusted to the installed system. In addition, although the capacity in the DSP must also increase in accordance with the scale-up of the USP, due to the limited size (2.0M) of a general column for purification, a downstream bottleneck phenomenon frequently occurs, so there is a problem of difficulty in flexibly responding to customers' needs.

DISCLOSURE

Technical Problem

In view of the above problems, the present invention was intended to properly reflect the needs of various customers in the biopharma contract manufacturing organization (CMO) business and secure flexibility due to multi-product production and frequent changeover. Therefore, the present invention is directed to providing a hybrid system of culture and purification processes for manufacturing antibody pharmaceuticals, in which one or more systems selected from a bioreactor, a chromatograph and filtration systems among components for cultivation and purification units for manufacturing antibody pharmaceuticals consist of one or more materials selected from single-use (SU) disposable bags and stainless steel (SS) and one or more systems selected from tanks for preparing and storing a medium and a buffer are formed of an SS material, thereby simultaneously obtaining the advantages of an SS process system and an SU process system, preventing cross-contamination through independent operation of a cultivation unit and a purification unit, and the process systems are designed and positioned such that an effluent stream from an individual cultivation unit is introduced into one or more purification units using a control unit in order to prevent a downstream bottleneck phenomenon.

In addition, technical problems to be solved in the present invention are not limited to the above-described technical problems, and other problems which are not described herein will be fully understood by those of ordinary skill in the art from the following descriptions.

Technical Solution

The specification provides a hybrid system of culture and purification processes for manufacturing antibody pharmaceuticals, which includes:

one or more cultivation units including, as components for a culture process, a media preparation tank for preparing a medium in advance, a media hold tank for receiving the media from the media preparation tank and storing the medium, a feed line through which a feeding stream including thawed cells and a culture medium is introduced to a bioreactor, one or more bioreactors including a stirring system, which receives the thawed cells and the medium from the feeding stream and increases the number of cells through cell division, and a discharge line which discharges the medium containing the cells cultured in the bioreactor as an effluent stream; and one or more purification units including, as components for a purification process, a buffer preparation tank for preparing a buffer in advance, a buffer storage tank for receiving the buffer from the buffer preparation tank and storing the buffer, a chromatograph for removing impurities mixed in the medium using the medium received from the cultivation unit and the buffer transferred from the buffer storage tank to increase the purity of a target protein, and one or more filtration systems which are disposed before or after the chromatograph to perform buffer exchange and concentration, wherein among the components of the cultivation and purification units, one or more devices selected from the bioreactor, chromatograph and the filtration systems are formed of one or more materials selected from single-use (SU) disposable bags and stainless steel (SS), and one or more systems selected from the medium and buffer preparation and storage tanks are formed of an SS material.

The specification also provides a hybrid system of culture and purification processes for manufacturing antibody pharmaceuticals, in which one cultivation unit and one purification unit, disposed on the same line, are configured as one suite unit, in which the cultivation unit and the purification unit are independently operated, and the cultivation unit in one suite unit is connected with one or more purification units selected from the same suite unit and another suite unit to prevent a downstream bottleneck phenomenon.

In addition, in the specification, the hybrid system of culture and purification processes for manufacturing antibody pharmaceuticals has a multi-floor structure with several floors each of which has one suite unit, and the effluent stream discharged along the discharge line is controlled to be introduced horizontally to a purification unit in the same suite located on the same floor and vertically to a purification unit in a different suite located on a different floor by the control unit.

In addition, in the specification, the chromatograph in the purification unit may be one selected from an affinity chromatograph, an ion exchange chromatograph, a hydrophobic interaction chromatograph and a mixed-mode chromatograph, or a combination thereof.

In addition, in the specification, the chromatograph in the purification unit is a sequential connection of a cation exchange chromatograph for primarily purifying the medium transferred from the cultivation unit; a hydrophobic interaction chromatograph for secondarily purifying the medium recovered from the ion exchange chromatograph; and an anion exchange chromatograph for thirdly purifying the medium recovered from the hydrophobic interaction chromatograph.

In addition, in the specification, the filtration system is one or more filters selected from an ultrafiltration filter and a diafiltration filter.

In addition, in the specification, the hybrid system is for manufacturing one or more antibody pharmaceuticals selected from the group consisting of abagovomab, abciximab, adalimumab, adecatumumab, alemtuzumab, altumomab, altumomab pentetate, anatumomab, anatumomab mafenatox, arcitumomab, atlizumab, basiliximab, bectumomab, ectumomab, belimumab, benralizumab, bevacizumab, brentuximab, canakinumab, capromab, capromab pendetide, catumaxomab, certolizumab, clivatuzumab tetraxetan, daclizumab, denosumab, eculizumab, edrecolomab, efalizumab, etaracizumab, ertumaxomab, fanolesomab, fontolizumab, gemtuzumab, girentuximab, golimumab, ibritumomab, igovomab, infliximab, ipilimumab, labetuzumab, mepolizumab, muromonab, muromonab-CD3, natalizumab, necitumumab, nimotuzumab, ofatumumab, omalizumab, oregovomab, palivizumab, panitumumab, ranibizumab, rituximab, satumomab, sulesomab, ibritumomab, ibritumomab tiuxetan, tocilizumab, tositumomab, trastuzumab, ustekinumab, visilizumab, votumumab, zalutumumab, brodalumab, anrukinzumab, bapineuzumab, dalotuzumab, demcizumab, ganitumab, inotuzumab, mavrilimumab, moxetumomab pasudotox, rilotumumab, sifalimumab, tanezumab, tralokinumab, tremelimumab, urelumab, adornase alfa, Rebif, becaplermin, alteplase, laronidase, alefacept, aflibercept, raxibacumab, darbepoetin alfa, becaplermin concentrate, interferon beta-1b, botulinum toxin type A, rasburicase, asparaginase, epoetin alfa, etanercept, agalsidase beta, interferon alfacon-1, interferon alfa-2a, anakinra, botulinum toxin type B, pegfilgrastim, oprelvekin, filgrastim, denileukin diftitox, peginterferon alfa-2a, aldesleukin, dornase alfa, interferon beta-1a, becaplermin, reteplase, interferon alfa-2, tenecteplase, drotrecogin alfa, rilonacept, romiplostim, methoxypolyethylene glycol-epoetin beta, a C1 esterase inhibitor, idursulfase, alglucosidase alfa, abatacept, galsulfase, palifermin and interferon gamma-1b.

Advantageous Effects

A hybrid system according to the present invention can include one or more systems selected from a bioreactor, a chromatograph and filtration systems among components for cultivation and purification units for manufacturing antibody pharmaceuticals consisting of one or more materials selected from single-use (SU) disposable bags and stainless steel (SS) and one or more systems selected from tanks for preparing and storing a medium and a buffer are formed of an SS material, thereby simultaneously obtaining the advantages of an SS process system and an SU process system and preventing cross-contamination through independent operation of a cultivation unit and a purification unit.

In addition, the hybrid system according to the present invention prevents a downstream bottleneck phenomenon by designing and disposing process systems such that an effluent stream discharged from an individual cultivation unit is introduced to one or more purification units using a control unit.

Accordingly, in the manufacture of antibody pharmaceuticals, when the hybrid system is employed, the cost and efficiency of the process can be improved, and a more efficient smart factory can be implemented.

MODES OF THE INVENTION

The terms used in the specification are used only to describe specific examples, not to limit the present invention. Singular expressions include plural expressions unless clearly indicated otherwise in the context. It should be understood that the term "comprise," "include," or "have" used herein is for indicating the presence of implemented characteristics, numbers, steps, elements or a combination thereof, and does not preclude the possibility of the presence or addition of one or more other characteristics, numbers, steps, elements or a combination thereof.

In addition, in the present invention, when a layer or element is referred to as being formed "on" or "over" each layer or element, it is meant that each layer or element is formed directly on each layer or element, or another layer or element is formed on each layer or element, or that another layer or element may additionally be formed between layers, on an object, or a substrate.

The present invention may have various modifications and various examples, and thus specific examples are illustrated in the drawings and described in detail in the detailed description. However, it should be understood that the present invention is not limited to specific embodiments, and includes all modifications, equivalents or alternatives within the spirit and technical scope of the present invention.

In the present invention, the term "suite" used throughout the specification and claims should be understood to mean one unit space in which a series of components provided for a culture or purification process, such as a bioreactor, a feed line, a discharge line, various sensors, ports, and valves are designed and arranged.

In addition, in the present invention, the term "unit" used throughout the specification and claims may mean a software or hardware component, and the "unit" performs a certain role. However, the "unit" is not limited to software or hardware. The "unit" may be configured to be present in an addressable storage medium or to regenerate one or more processors. Therefore, in one example, the "unit" includes components such as software components, object-oriented software components, class components and task components, processors, functions, properties, procedures, subroutines, segments of program code, drivers, firmware, microcode, circuit, data, database, data structures, tables, arrays, and variables. The functions provided in the components and "units" may be combined into a smaller number of components and "units", or further separated into additional components and "units."

According to one embodiment of the present invention, the "unit" may be implemented as a processor and a memory. The term "processor" should be construed broadly to include a general-purpose processor, a central processing unit (CPU), a microprocessor, a digital signal processor (DSP), a controller, a microcontroller, and a state machine. In some circumstances, the "processor" may refer to an application-specific integrated circuit (ASIC), a programmable logic device (PLD), or a field programmable gate array (FPGA). The term "processor" may also refer to a combination of processing devices, for example, a combination of a DSP and a microprocessor, a combination of a plurality of microprocessors, a combination of one or more microprocessors combined with a DSP core, or a combination of random components.

The term "memory" should be construed broadly to include any electronic component that can store electronic information. The term "memory" may also refer to various types of processor-readable media such as a random access memory (RAM), a read-only memory (ROM), a non-volatile random access memory (NVRAM), a programmable read-only memory (PROM), an erase-programmable read-only memory (EPROM), an electrically erasable PROM (EEPROM), a flash memory, magnetic or optical data storage devices, and registers. A memory is said to be in electronic communication with the processor if the processor is capable of reading information from and/or writing information to the memory. The memory integrated in the processor is in electronic communication with the processor.

Hereinafter, a hybrid system of culture and purification processes for manufacturing antibody pharmaceuticals according to exemplary embodiments of the present invention will be described in further detail.

Securing Intra Suite Flexibility

A hybrid system of culture and purification processes for manufacturing antibody pharmaceuticals according to one embodiment of the present invention includes one or more cultivation units including, as components for a culture process, a media preparation tank for preparing a medium in advance; a media hold tank for receiving the media from the media preparation tank and storing the medium, a feed line through which a feeding stream including thawed cells and a culture medium is introduced to a bioreactor, one or more bioreactors including a stirring system, which receives the thawed cells and the medium from the feeding stream and increases the number of cells through cell division, and a discharge line which discharges the medium containing the cells cultured in the bioreactor as an effluent stream; and one or more purification units including, as components for a purification process, a buffer preparation tank for preparing a buffer in advance, a buffer storage tank for receiving the buffer from the buffer preparation tank and storing the buffer, a chromatograph for removing impurities mixed in the medium using the medium received from the cultivation unit and the buffer transferred from the buffer storage tank to increase the purity of a target protein, and one or more filtration systems which are disposed before or after the chromatograph to perform buffer exchange and concentration, wherein among the components of the cultivation and purification units, one or more systems selected from the bioreactor, chromatograph and the filtration systems are formed of one or more materials selected from single-use (SU) disposable bags and stainless steel (SS), and one or more systems selected from the media preparation tank and the buffer storage tank are formed of an SS material.

In further detail, the process of manufacturing antibody pharmaceuticals consists of initial candidate material and cell line development, a culture process (upstream processing (USP)), a purification process (downstream processing (DSP)), and a fill and finish process.

First, the culture process (USP) corresponds to the process of continuously increasing the number of cells through cell division for approximately 6 weeks from the initial flask stage of less than 1 liter to the final production bioreactor stage of 15,000 L or more, after thawing the cell line.

The cultivation unit according to the present invention is a set of components for the culture process (USP), which may include a media preparation tank for preparing a medium in advance, a media hold tank for receiving the media from the media preparation tank and storing the medium, a feed line through which a feeding stream including thawed cells and a culture medium is introduced to a bioreactor, one or more bioreactors including a stirring system, which receives the thawed cells and the medium from the feeding stream and increases the number of cells through cell division, and a discharge line which discharges the medium containing the cells cultured in the bioreactor as an effluent stream.

Next, the purification process (DSP) corresponds to the process of extracting a protein to be used as a pharmaceutical with high purity and high efficiency from the culture in which cells and cell debris are mixed through the manipulation and use of various types of chromatographs and filters.

The purification unit according to one embodiment of the present invention is a set of components for the purification process (DSP), which may include a buffer preparation tank for preparing a buffer in advance, a buffer storage tank for receiving the buffer from the buffer preparation tank and storing the buffer, a chromatograph for removing impurities mixed in the medium using the medium received from the cultivation unit and the buffer transferred from the buffer storage tank to increase the purity of a target protein, and one or more filtration systems which are disposed before or after the chromatograph to perform buffer exchange and concentration.

Meanwhile, the components and systems used in the USP and DSP are divided into stainless steel (SS) and single-use (SU) using disposable bags or tubes in terms of material, and among these, although the SS process system including device components made of SS has advantages of easy implementation on a relatively large scale, low operation cost and easy automation, the initial installation cost is high, it is vulnerable to contamination and prone to the downstream bottleneck phenomenon occurring in the DSP, caused by the implementation of a large-sized bioreactor.

The SU process system, which has recently been introduced, uses disposable bags or tubes with a volume of 0.1 to 2,000 L as device components, and compared to the SS process system, has advantages of relatively low cost for initial installation and being relatively resistant to contamination because a corresponding part can be replaced upon contamination. However, scale-up limitations, continuous operation costs caused by frequent bag replacement and the input of a lot of labor during equipment replacement are pointed out as disadvantages.

The present inventors confirmed that one or more systems selected from a bioreactor, a chromatograph and filtration systems among components for cultivation and purification units for manufacturing antibody pharmaceuticals consist of one or more materials selected from single-use (SU) disposable bags and stainless steel (SS) and one or more systems selected from tanks for preparing and storing a medium and a buffer are formed of an SS material, simultaneously obtaining the advantages of an SS process system and an SU process system and preventing cross-contamination through independent operation of a cultivation unit and a purification unit, and moreover, when the process systems are designed and positioned such that the effluent stream discharged from the a separate cultivation unit is introduced to one or more purification units using a control unit, a downstream bottleneck phenomenon may be prevented, and thus completed the present invention.

Figure 1:
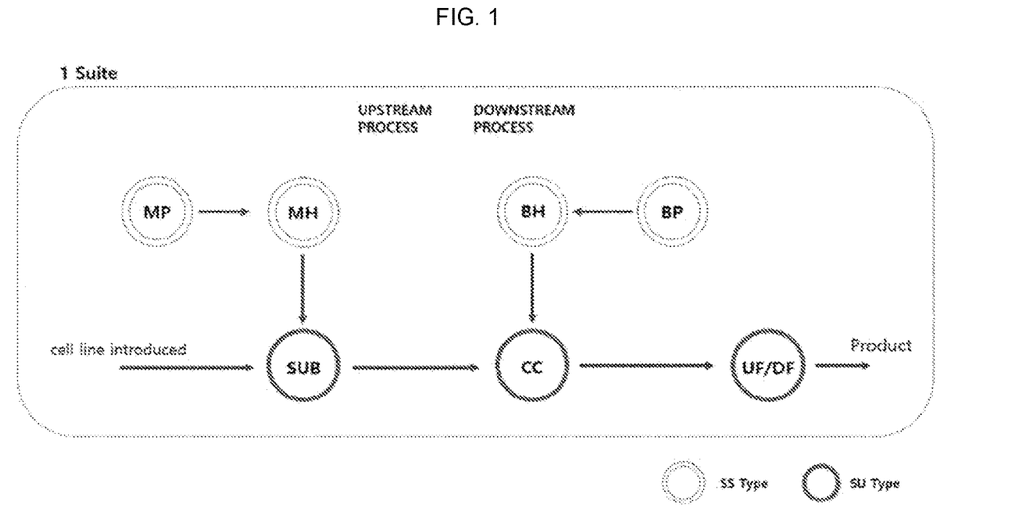
FIG. 1 schematically shows a hybrid system in which components formed of an SU disposable bag and an SS material are suitably designed and disposed in a process of manufacturing antibody pharmaceuticals according to one embodiment of the present invention.

Specifically, according to one embodiment of the present invention, among the components of the cultivation and purification units, one or more systems selected from the bioreactor, chromatograph and the filtration systems are formed of one or more materials selected from single-use (SU) disposable bags and stainless steel (SS), and one or more systems selected from the medium and buffer preparation and storage tanks are formed of an SS material (see FIG. 1).

In one example, among the components for the cultivation and purification units, the bioreactor, which is a core component, is provided with an SU material, and the chromatograph and the filtration system can flexibly consist of an SU or SS material in consideration of the characteristics of a target pharmaceutical and the corresponding process, and the medium and buffer preparation and storage tanks, which are secondary components (bodies) requiring a relatively large capacity, may consist of an SS material. Meanwhile, the term "single-use (SU) disposable bag" used through the specification and claims may encompass an SU disposable bag or disposable tube.

In CMOs, when core components such as the bioreactor, the chromatograph and the filtration system are composed of an SU material, because of the characteristics of a relatively light and easily replaceable SU material, it is possible to change or frequently replace components according to the type and amount of a desired antibody pharmaceutical. Therefore, it is not only convenient to produce a variety of products according to the needs of various customers and correspond to frequent changeovers, but also advantageous for securing flexibility in a suite where the process is performed (securing intra suite flexibility).

In addition, the SU bioreactor is easy to frequently replace with equipment optimized for the customer's needs, a target product and a corresponding process in consideration of factors such as a volume capacity, a turndown ratio, and a mass transfer coefficient, and the chromatograph and the filtration system is easy to frequently replace with equipment optimized for the customer's needs, a target product and purification performance in consideration of factors such as a dynamic binding capacity, a linear velocity, a concentration capacity, and a flow rate.

Accordingly, in the CMO business, it is possible to provide optimal productivity to customers at reasonable cost in terms of engineering.

In addition, when components for the culture and purification processes constitute a hybrid system, the advantages of an SS system, such as easy implementation on a relatively large scale, a low operation cost and easy automation, and the advantages of an SU system, such as a relatively low initial installation cost and relatively high resistance to contamination because a contaminated part can be replaced upon contamination can be obtained at the same time. Further, in the configuration of the hybrid system, when a core component (core) and a secondary component (body) to be disposed in a suite are designed to be disposed as close as possible, fast liquid transfer is possible, and the manpower required in the assembly of tubes for linking the components can be minimized.

Securing Inter Suite Flexibility

A hybrid system of culture and purification processes for manufacturing antibody pharmaceuticals according to another embodiment of the present invention is configured to have one suite unit composed of one cultivation unit and one purification unit, disposed on the same line, wherein the cultivation unit and the purification unit may be independently operated and the cultivation unit in one suite unit may be linked with one or more purification units selected from the purification units in the same suite unit and a different suite unit to prevent a downstream bottleneck phenomenon.

In more detail, one suite unit is a unit space including one cultivation unit and one purification unit, and the cultivation unit and the purification unit are horizontally disposed on the same line, and sequentially disposed.

However, even when the cultivation unit and the purification unit are disposed in one suite unit, the operation is independently performed, so that a cultivation unit in one suite unit is not necessarily connected to a purification unit in the same suite unit, and may be connected to one or more purification units selected from purification units in the same suite unit and a different suite unit.

Figure 2:
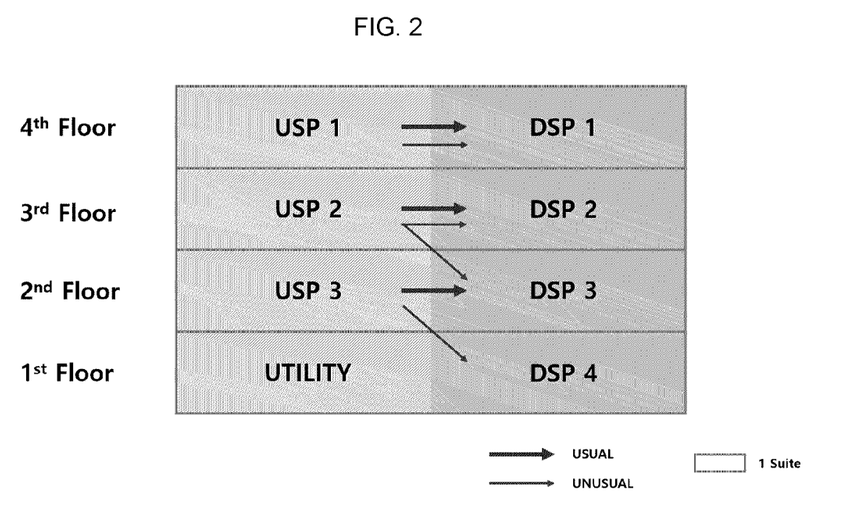
FIG. 2 schematically shows a hybrid system which has a multi-floor structure with several floors, each of which has one suite consisting of one cultivation unit and one purification unit, and in which components are designed and disposed such that an effluent stream discharged from the cultivation unit is introduced to one or more purification units according to another embodiment of the present invention.
Figure 3:
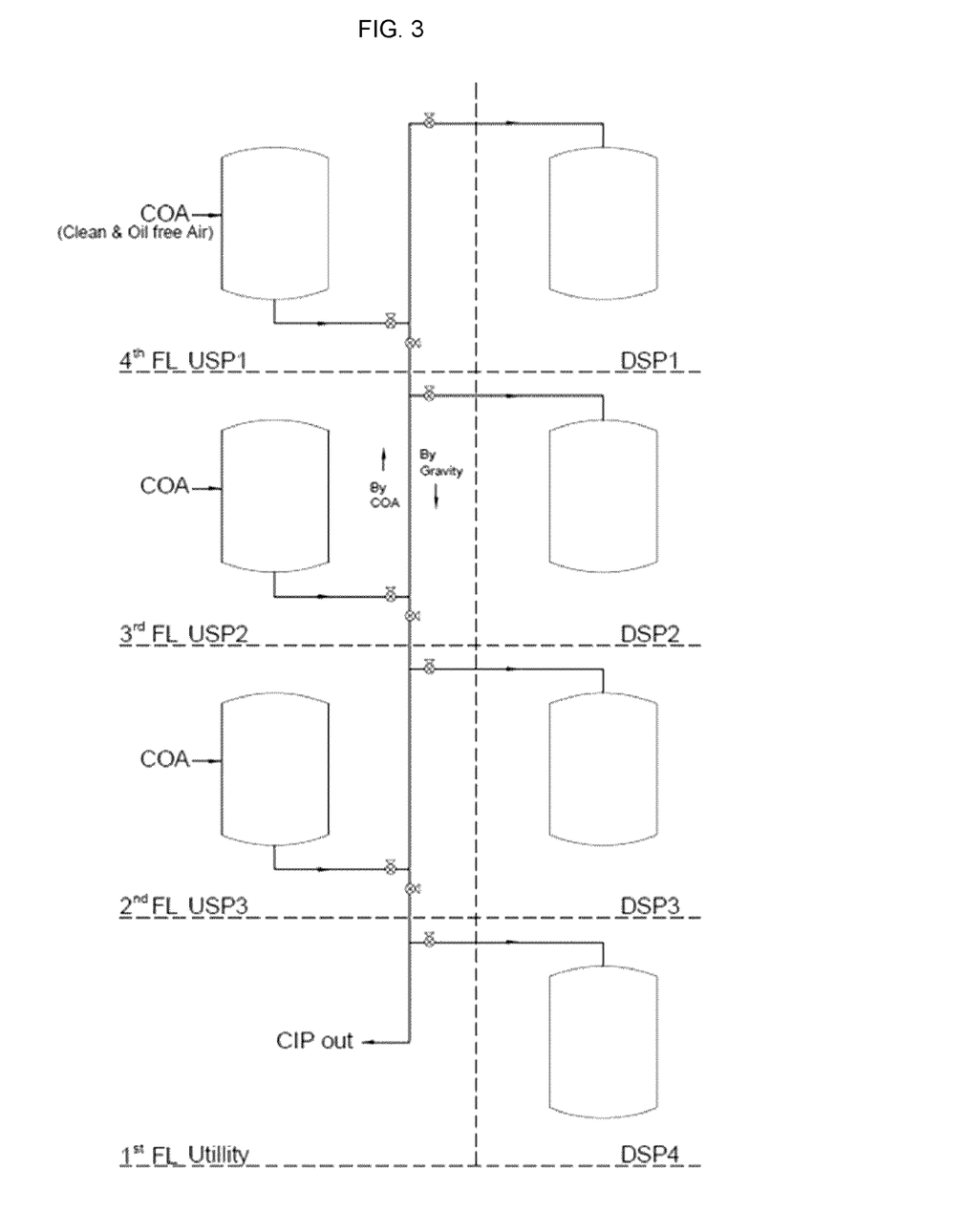
FIG. 3 schematically shows a hybrid system in which an effluent stream discharged along a discharge line is introduced horizontally to a purification unit in the same suite located on the same floor and vertically to a purification unit in a different suite located on a different floor by a control unit according to still another embodiment of the present invention.

In one example, the hybrid system has a multi-floor structure with several floors each of which has one suite unit, and the effluent stream discharged along the discharge line is controlled to be introduced horizontally to a purification unit in the same suite located on the same floor and vertically to a purification unit in a different suite located on a different floor by the control unit (see FIG. 2).

Meanwhile, the term "horizontal introduction" used herein should not be understood to mean that the discharge line of the cultivation unit itself is formed horizontally so that the effluent stream horizontally moves, and even when the discharge line is a mixture of horizontal and vertical portions, when introduced to purification units located on the same floor (in the same suite), it should be understood to be "horizontal introduction," and the term "vertical introduction" should be understood to mean that the discharge line of the cultivation unit is introduced to a purification unit in a suite located on a different flood, not in the same suite.

Meanwhile, when the effluent stream is delivered to a high place along the discharge line, it can be delivered using clean and oil-free air (COA), and when delivered to a low place, it can be delivered by gravity.

In the conventional process of manufacturing biopharmaceuticals, it is common that the process is configured in a form in which a cultivation unit and a purification unit are matched in a 1:1 ratio. In this case, due to the limitation (maximum φ2,000 mm) of the column capacity of a chromatograph used in the purification process (DSP), even when high productivity is secured through scale-up in the culture process (USP), a bottleneck phenomenon that cannot be effectively handled in the purification process (DSP) chronically occurs. For example, the insufficient capacity of the chromatograph process requires two or more cycles of the chromatograph process, leading to a delay in process time.

Meanwhile, in the hybrid system according to the present invention, since cells cultured in the scaled-up cultivation unit may be introduced to one or more non-operative purification units, for example, two or three purification units and simultaneously purified, the purification process may be fluidly performed, so it is possible to effectively prevent a downstream bottleneck phenomenon.

In one example, when the humanized IgG1 monoclonal antibody, trastuzumab, is produced by matching multiple purification units to one culture process, compared to the conventional process system in which the cultivation unit and the purification unit are matched 1:1, the process time can be innovatively shortened (e.g., 1 day) (securing inter suite flexibility).

Meanwhile, the introduction of the effluent stream discharged along the discharge line of each cultivation unit to one or more purification units is controlled by a control unit, the control unit may include one or more components selected from a processor and a memory, and in the processor, instructions stored in the memory may be executed. Meanwhile, the processor may include, for example, a central processing unit (CPU), a graphics processing device (GPU) or both, and in one example, may be of a type in which the process operation is automated (adjusted and controlled) by the processor and the memory in the control unit. In one example, the control unit according to one embodiment of the present invention may be a programmable logic controller (PLC).

Meanwhile, chromatograph in the purification unit according to one embodiment of the present invention may be one selected from an affinity chromatograph, an ion exchange chromatograph, a hydrophobic interaction chromatograph and a mixed-mode chromatograph, or a combination thereof.

The chromatograph is used to manufacture a high-quality antibody population by removing host cell proteins and host cell-derived DNA from an antibody product (a main active antibody, an isomeric antibody, a host cell protein (HCP), host cell-derived DNA and a cell growth factor, etc.) manufactured using host cells, and in one example, the chromatograph in the purification unit may be a sequential connection of a cation exchange chromatograph for primarily purifying the medium transferred from the cultivation unit; a hydrophobic interaction chromatograph for secondarily purifying the medium recovered from the ion exchange chromatograph; and an anion exchange chromatograph for thirdly purifying the medium recovered from the hydrophobic interaction chromatograph, but the present invention is not limited thereto. Various design changes are possible depending on the customer's request and the type and production of antibody pharmaceuticals.

Meanwhile, the filtration system according to one embodiment of the present invention may be one or more filters selected from an ultrafiltration filter and a diafiltration filter.

The ultrafiltration filter (UF) refers to nay technical configuration that treats a solution or suspension with a semi-permeable membrane that retains macromolecules while passing a solvent or small solute molecules, and may be used to increase the concentration of macromolecules in a solution or suspension.

The diafiltration filter (DF) refers to a technical configuration associated with the specialized category of filtration in which a retentate is diluted and refiltrated with a solvent to reduce a component in a soluble permeate, and may be used to change pH, an ionic strength, a salt composition, a buffer composition, or other characteristics of a macromolecule solution or suspension.

Meanwhile, each of the cultivation unit and the purification unit may be configured to further include a product storage tank for storing an intermediate product and a process solution, and the product storage tank may be formed of an SS material. Meanwhile, the purification unit may further include a series of components for virus inactivation and viral removal.

Meanwhile, the hybrid system according to one embodiment of the present invention may be used to manufacture one or more antibody pharmaceuticals selected from the group consisting of abagovomab, abciximab, adalimumab, adecatumumab, alemtuzumab, altumomab, altumomab pentetate, anatumomab, anatumomab mafenatox, arcitumomab, atlizumab, basiliximab, bectumomab, ectumomab, belimumab, benralizumab, bevacizumab, brentuximab, canakinumab, capromab, capromab pendetide, catumaxomab, certolizumab, clivatuzumab tetraxetan, daclizumab, denosumab, eculizumab, edrecolomab, efalizumab, etaracizumab, ertumaxomab, fanolesomab, fontolizumab, gemtuzumab, girentuximab, golimumab, ibritumomab, igovomab, infliximab, ipilimumab, labetuzumab, mepolizumab, muromonab, muromonab-CD3, natalizumab, necitumumab, nimotuzumab, ofatumumab, omalizumab, oregovomab, palivizumab, panitumumab, ranibizumab, rituximab, satumomab, sulesomab, ibritumomab, ibritumomab tiuxetan, tocilizumab, tositumomab, trastuzumab, ustekinumab, visilizumab, votumumab, zalutumumab, brodalumab, anrukinzumab, bapineuzumab, dalotuzumab, demcizumab, ganitumab, inotuzumab, mavrilimumab, moxetumomab pasudotox, rilotumumab, sifalimumab, tanezumab, tralokinumab, tremelimumab, urelumab, adornase alfa, Rebif, becaplerm in, alteplase, laronidase, alefacept, aflibercept, raxibacumab, darbepoetin alfa, becaplermin concentrate, interferon beta-1b, botulinum toxin type A, rasburicase, asparaginase, epoetin alfa, etanercept, agalsidase beta, interferon alfacon-1, interferon alfa-2a, anakinra, botulinum toxin type B, pegfilgrastim, oprelvekin, filgrastim, denileukin diftitox, peginterferon alfa-2a, aldesleukin, dornase alfa, interferon beta-1a, becaplermin, reteplase, interferon alfa-2, tenecteplase, drotrecogin alfa, rilonacept, romiplostim, methoxypolyethylene glycol-epoetin beta, a C1 esterase inhibitor, idursulfase, alglucosidase alfa, abatacept, galsulfase, palifermin and interferon gamma-1b, and it can be variously used throughout a process of manufacturing antibody pharmaceuticals, such as biopharmaceuticals, improved biopharmaceuticals (biobetters) and biosimilars.

In the aforementioned hybrid system of the present invention, one or more systems selected from the bioreactor, chromatograph and the filtration system among the components of the cultivation and purification units for manufacturing antibody pharmaceuticals are formed of one or more selected from an SU disposable bag and SS, and one or more systems selected from the medium and buffer preparation and storage tanks are formed of an SS material, so the advantages of the SS process system and the SU process system may be obtained at the same time, and cross-contamination can be prevented through independent operation of the cultivation unit and the purification unit.

In addition, the hybrid system of the present invention prevents a downstream bottleneck phenomenon by designing and disposing a process system such that the effluent stream discharged from a separate cultivation unit is introduced to one or more purification units using a control unit.

Accordingly, in the manufacture of antibody pharmaceuticals, when the hybrid system is adopted, process costs and efficiency can be improved, and a smart factory can be more effectively implemented.

In the above, the present invention has been described with reference to exemplary embodiments, but the present invention is not limited to the described embodiments, and it is obvious to those skilled in the art or those of ordinary skill in the art that the present invention can be variously modified and changed without departing the spirit and scope of the present invention. Accordingly, such modifications or variations should not be individually understood from the technical spirit or point of view of the present invention, and the modified embodiments should belong to the claims of the present invention.

What is claimed is:

1. A hybrid system of culture and purification processes for manufacturing antibody pharmaceuticals, comprising:
   one or more cultivation units including, as components for a culture process, a media preparation tank for preparing a medium in advance, a media hold tank for receiving the media from the media preparation tank and storing the medium, a feed line through which a feeding stream including thawed cells and a culture medium is introduced to a bioreactor, one or more bioreactors including a stirring system, which receives the thawed cells and the medium from the feeding stream and increases the number of cells through cell division, and a discharge line which discharges the medium containing the cells cultured in the bioreactor as an effluent stream; and
   one or more purification units including, as components for a purification process, a buffer preparation tank for preparing a buffer in advance, a buffer storage tank for receiving the buffer from the buffer preparation tank and storing the buffer, a chromatograph for removing impurities mixed in the medium using the medium received from the cultivation unit and the buffer transferred from the buffer storage tank to increase the purity of a target protein, and one or more filtration systems which are disposed before or after the chromatograph to perform buffer exchange and concentration,
   wherein among the components of the cultivation and purification units, one or more devices selected from the bioreactor, chromatograph and the filtration systems are formed of single-use (SU) disposable bags and stainless steel (SS), and one or more systems selected from the media preparation tank and the buffer storage tank are formed of a stainless steel (SS) material,
   wherein one cultivation unit and one purification unit, disposed on the same line, are configured as one suite unit, in which the cultivation unit and the purification unit are independently operated, and
   the cultivation unit in one suite unit is connected with two or more purification units selected from the same suite unit and another suite unit to prevent a downstream bottleneck phenomenon.

2. The hybrid system of claim 1, wherein the hybrid system has a multi-floor structure with several floors each of which has one suite unit, and
   the effluent stream discharged along the discharge line is controlled to be introduced horizontally to a purification unit in the same suite located on the same floor and vertically to a purification unit in a different suite located on a different floor by a control unit.

3. The hybrid system of claim 1, wherein the chromatograph in the purification unit is one selected from an affinity chromatograph, an ion exchange chromatograph, a hydrophobic interaction chromatograph and a mixed-mode chromatograph, or a combination thereof.

4. The hybrid system of claim 3, wherein the chromatograph in the purification unit is a sequential connection of a cation exchange chromatograph for primarily purifying the medium transferred from the cultivation unit; a hydrophobic interaction chromatograph for secondarily purifying the medium recovered from the ion exchange chromatograph; and an anion exchange chromatograph for thirdly purifying the medium recovered from the hydrophobic interaction chromatograph.

5. The hybrid system of claim 1, wherein the filtration system is one or more filters selected from an ultrafiltration filter and a diafiltration filter.

6. The hybrid system of claim 1, wherein the hybrid system is for manufacturing one or more antibody pharmaceuticals selected from the group consisting of abagovomab, abciximab, adalimumab, adecatumumab, alemtuzumab, altumomab, altumomab pentetate, anatumomab, anatumomab mafenatox, arcitumomab, atlizumab, basiliximab, bectumomab, ectumomab, belimumab, benralizumab, bevacizumab, brentuximab, canakinumab, capromab, capromab pendetide, catumaxomab, certolizumab, clivatuzumab tetraxetan, daclizumab, denosumab, eculizumab, edrecolomab, efalizumab, etaracizumab, ertumaxomab, fanolesomab, fontolizumab, gemtuzumab, girentuximab, golimumab, ibritumomab, igovomab, infliximab, ipilimumab, labetuzumab, mepolizumab, muromonab, muromonab-CD3, natalizumab, necitumumab, nimotuzumab, ofatumumab, omalizumab, oregovomab, palivizumab, panitumumab, ranibizumab, rituximab, satumomab, sulesomab, ibritumomab, ibritumomab tiuxetan, tocilizumab, tositumomab, trastuzumab, ustekinumab, visilizumab, votumumab, zalutumumab, brodalumab, anrukinzumab, bapineuzumab, dalotuzumab, demcizumab, ganitumab, inotuzumab, mavrilimumab, moxetumomab pasudotox, rilotumumab, sifalimumab, tanezumab, tralokinumab, tremelimumab, urelumab, adornase alfa, Rebif, becaplermin, alteplase, laronidase, alefacept, aflibercept, raxibacumab, darbepoetin alfa, becaplermin concentrate, interferon beta-1b, botulinum toxin type A, rasburicase, asparaginase, epoetin alfa, etanercept, agalsidase beta, interferon alfacon-1, interferon alfa-2a, anakinra, botulinum toxin type B, pegfilgrastim, oprelvekin, filgrastim, denileukin diftitox, peginterferon alfa-2a, aldesleukin, dornase alfa, interferon beta-1a, becaplermin, reteplase, interferon alfa-2, tenecteplase, drotrecogin alfa, rilonacept, romiplostim, methoxypolyethylene glycol-epoetin beta, a C1 esterase inhibitor, idursulfase, alglucosidase alfa, abatacept, galsulfase, palifermin and interferon gamma-1b.

* * * * *